May 12, 1964
Q. L. HAMPTON
3,132,773
SLUDGE REMOVING APPARATUS FOR A SETTLING TANK
Filed Dec. 17, 1962
2 Sheets-Sheet 2
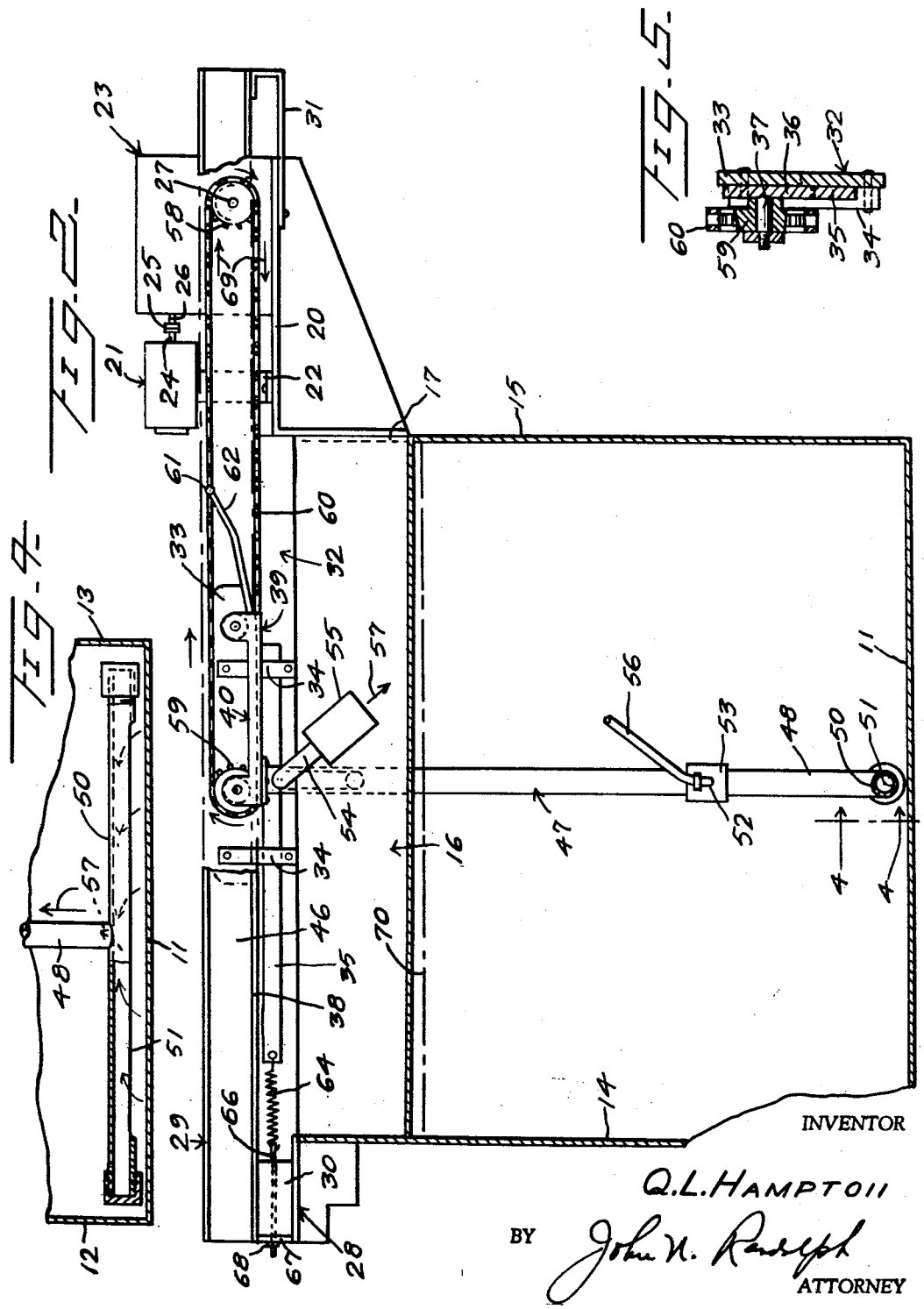
INVENTOR
Q. L. HAMPTON
BY John N. Randolph
ATTORNEY

United States Patent Office 3,132,773
Patented May 12, 1964

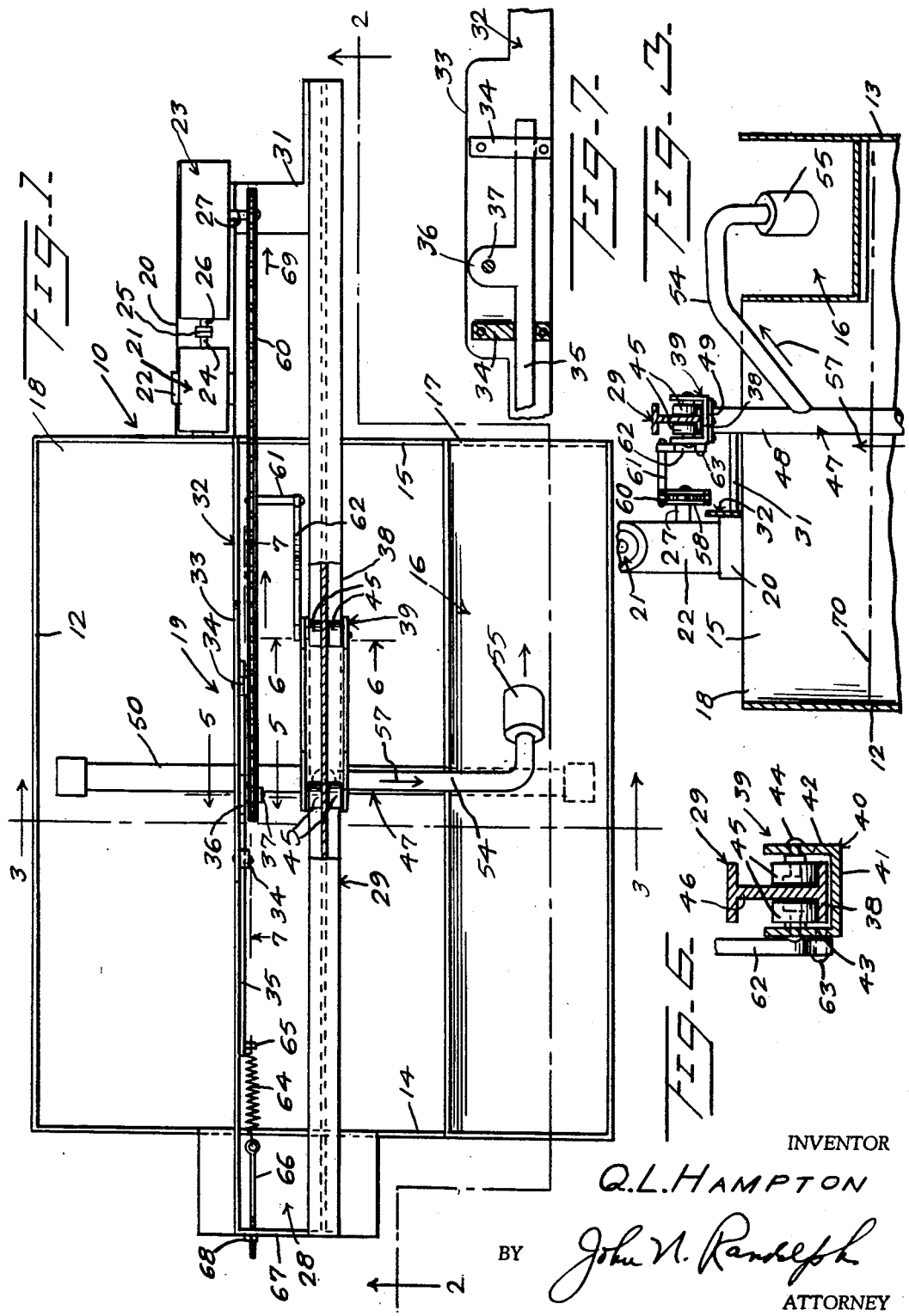

3,132,773
SLUDGE REMOVING APPARATUS FOR A SETTLING TANK
Quentin L. Hampton, 64 Kent Drive, Ormond Beach, Fla.
Filed Dec. 17, 1962, Ser. No. 245,162
1 Claim. (Cl. 222—376)

This invention relates to an apparatus of extremely simple construction which may be readily mounted on a settling tank or other open top liquid container, and which will efficiently function for collecting and removing sludge continuously from the bottom of said tank or container.

Still another object of the invention is to provide an apparatus which may be employed for continuously removing the lower level contents from liquid containing tanks or receptacles.

A further object of the invention is to provide an apparatus having no relatively moving parts such as wear surfaces, bearings, chains, sprocket wheels, cams, rails, guides, slots, pins, wheels or the like which are in contact with the contents of the tank or receptacle with which the apparatus functions.

Another object of the invention is to provide an apparatus which accomplishes the functions of collecting, removing and pumping settled matter from the bottom of a tank or receptacle, in counterdistinction to conventional devices, now utilized, which require separate equipment for collecting, removing and pumping.

Still another object of the invention is to provide an apparatus which will efficiently serve settling tanks and other receptacles having flat bottoms and not equipped with sludge hoppers.

Various other objects and advantages of the invention will hereinafter become more fully apparent from the following description of the drawings, illustrating a presently preferred embodiment thereof, and wherein:

FIGURE 1 is a top plan view of the invention;

FIGURE 2 is a fragmentary longitudinal sectional view thereof taken substantially along the line 2—2 of FIGURE 1;

FIGURE 3 is a fragmentary cross sectional view, taken substantially along a plane as indicated by the line 3—3 of FIGURE 1;

FIGURE 4 is a fragmentary cross sectional view taken substantially along a plane as indicated by the line 4—4 of FIGURE 2;

FIGURE 5 is an enlarged fragmentary transverse sectional view taken substantially along a plane as indicated by the line 5—5 of FIGURE 1;

FIGURE 6 is a fragmentary transverse sectional view, on an enlarged scale, taken substantially along a plane as indicated by the line 6—6 of FIGURE 1, and FIGURE 7 is an enlarged fragmentary longitudinal sectional view taken substantially along the line 7—7 of FIGURE 1.

Referring more specifically to the drawings, a settling tank, designated generally 10, includes a substantially flat bottom 11, side walls 12 and 13 and end walls 14 and 15. The tank 10 is shown provided with a trough 16 which is formed in a portion of the top thereof and which is partially formed by the upper part of the side wall 13, as seen in FIGURE 3. The trough 16 has an open end 17 which opens through the upper portion of the end wall 15, and the trough 16 preferably slopes slightly downward toward its open end 17, as seen in FIGURE 2. The remainder of the top of the tank or receptacle 10 is open, as seen at 18.

The trough 16 constitutes a part of the sludge removing apparatus, designated generally 19, and which additionally includes a bracket 20 which is fixed to and extends outwardly from the end wall 15. A power source, such as an electric motor 21, is secured to and supported on a post 22 which is fixed to and rises from the bracket 20, and a conventional gear reduction unit 23 is secured to and supported by the bracket 20. The drive shaft 24 of the motor 21 is connected by a suitable coupling 25 to the input shaft 26 of the gear reduction unit 23 which has a laterally extending output shaft 27.

A bracket 28 is secured to and disposed on the outer side of the upper portion of the wall 14. One end of an I-beam 29 is supported on a member 30 which is fixed to and rises from the bracket 28 and the other end of said I-beam is scured to and supported by a bracket 31 which is in turn supported by the bracket 20, for supporting said I-beam 29 above and spaced from the upper edges of the end walls 14 and 15 and laterally offset from the gear reduction unit 23 and a wall member 32 which extends between the brackets 20 and 28, across the upper edges of the walls 14 and 15.

The wall member 32 has an upwardly enlarged intermediate portion 33 to which is fastened two longitudinally spaced guide members 34. A bar 35 is slidably supported in the guide members 34 on the inner side of the wall 32 which faces the I-beam 29, and said bar is provided with an upstanding ear 36 which is located between the guides 34 and which supports an outwardly projecting stub shaft 37.

The bottom flange 38 of the I-beam 29 constitutes a rail. A trolley, designated generally 39, includes an elongated frame 40 of U-shape cross section having a bottom 41 which is disposed beneath the rail 38 and sides 42 and 43 which straddle and are spaced from the rail. Each side 42 and 43 has an inwardly extending axle 44 near each end thereof and a wheel 45 is journaled on each axle 44. The transversely aligned wheels 45, located near each end of the frame 40, straddle the web 46 of the I-beam 29 and rest upon the upper side of the rail 38, as clearly illustrated in FIGURES 3 and 6. Thus, the trolley 39 is supported for free travel on the rail 38 back and forth above the open top 18 of the tank 10 and partially over the end walls 14 and 15.

A pump 47 of a conventional airlift type is supported by the trolley 39. The pump 47 includes a rigid conduit 48 having an upper end which is closed by a plate 49. The plate 49 is secured to the underside of the trolley bottom 41 for suspending the pump from the trolley. An elongated suction head 50 is connected to and communicates with the lower end of the tube or conduit 48 and is supported thereby within the tank 10 in close proximity to the bottom 11, as seen in FIGURES 2 and 4, and crosswise of the tube 48 and tank 10, so that the suction head 50 extends nearly across the bottom 11 to adjacent the side walls 12 and 13. The suction head 50 has a narrow inlet port 51 in the bottom thereof which extends nearly from end-to-end thereof. A nozzle 52 extends through a coupling 53 and discharges into the tube 48 above but adjacent the suction head 50. The pump 47 includes an outlet branch 54 which communicates with and leads from near the upper end of the tube 48 and which has a downturned discharge end provided with a nozzle 55 which discharges into the trough 16. A hose 56 leads upwardly from the air nozzle 52 and connects with a conventional source of compressed air, not shown, which is disposed externally of the tank 10, for supplying the air for operating the pump 47 to create a suction in the inlet head 50 to cause the contents in the bottom of the tank 10 to be pumped therefrom and discharged into the trough 16, as indicated by the arrows 57 in FIGURES 1 to 4.

A sprocket wheel 58 is fixed to the output shaft 27 and an idler sprocket wheel 59 is journaled on the stub shaft 37. An endless chain 60 is trained over the sprocket wheels 58 and 59 and has a pin 61 extending from one link thereof toward the I-beam 29. One end of a rigid link 62 is pivotally connected to the pin 61 and the other end of said link 62 is pivoted at 63, as seen in FIGURE 6, to the side wall 43 of the trolley 39.

One end of a pull spring 64 is connected to a pin 65 which extends laterally from the end of the bar 35 which is located near the end wall 14. The other end of the spring 64 is connected to an eyebolt 66 which extends outwardly through and is slidably mounted in a wall member 67 which rises from the bracket 28. A nut 68 threadedly engages the bolt 66 and bears against the outer side of the wall member 67 and can be manipulated for adjusting the tension of the spring 64 to maintain a desired tension on the chain 60.

The prime mover 21 will drive the input shaft 26 to cause the output shaft 27 to be driven at a greatly reduced r.p.m. and in a clockwise direction as seen in FIGURE 2 so that the chain 60 will move in the direction as indicated by the arrows 69. Assuming that the parts are in the positions as seen in FIGURES 1 and 2, the link 62 is exerting a pull on the trolley 39 for moving the trolley and pump 47 from left to right of FIGURES 1 and 2 and until the pin 61 passes halfway around the sprocket wheel 58, at which time the trolley 39 will be disposed above the end wall 15 and the pump 47 will be disposed in close proximity to said end wall. Thereafter, the link 62 will exert a thrust against the trolley 39 for pushing the trolley in the opposing direction along the rail 38, from right to left of FIGURES 1 and 2, and until the pin 61 has moved halfway around the sprocket wheel 59, at which time the leading end of the trolley 39 will partially overlie the end wall 14 and the pump 47 will be disposed in close proximity to said end wall. This back and forth travel of the trolley 39 and pump 47 will be continuous and the pump 47 will be operating simultaneously so that the sludge or lower level contents of the tank 10, which is filled with a liquid to approximately the liquid level 70, will be pumped from the bottom of the tank and separated from the tank contents. Due to the back and forth travel of the suction head 50 substantially from end-to-end of the tank 10, sludge and other bottom level contents of the tank will be removed substantially uniformly from all parts of the bottom level of the tank.

The trough 16 discharges at 17 externally of the tank 10 and is therefore considered to be located externally of the tank since all liquids and other materials discharged into said trough are separated from the contents of the tank, and the trough could obviously be located externally rather than internally of the tank wall 13 and the pump outlet 54 could be extended over said tank wall 13.

It will be noted that no parts of the apparatus 19 other than parts of the pump 47 will come in contact with the liquid 70 of the tank, and the portions of the pump 47 which are submerged in the liquid include no relatively movable parts other than the air hose 56 which is of a sufficient length and flexibility to accommodate the back and forth movement of the tube 48 between the tank walls 14 and 15.

Various modifications and changes are contemplated and may be resorted to, without departing from the function or scope of the invention as hereinafter defined by the appended claim.

I claim as my invention:

In combination with a settling receptacle having a substantially flat bottom and two substantially parallel walls rising from said bottom, a rail, means secured to and extending outwardly from said walls for supporting said rail above the walls and spanning the receptacle, a trolley mounted on the rail for reciprocating movement above the receptacle and including a bottom portion disposed beneath the rail, a pump supported by said trolley and suspended from said bottom portion thereof and including a suction head disposed within the receptacle in close proximity to the bottom thereof, said suction head being elongated and disposed crosswise of the rail and extending substantially across the receptacle bottom, a driven endless chain having top and bottom flights, means supported by said first mentioned means and supporting said chain above the receptacle parallel to and transversely spaced from a part of said rail, said trolley having a side wall disposed between said rail and said chain, a rigid link pivotally connected at one end to said side wall adjacent one end of the trolley and having an opposite end pivotally connected to the chain beyond and spaced from said end of the trolley for imparting reciprocating motion to the trolley when the chain is driven continuously in either direction by alternately pushing and pulling the trolley for moving the suction head back and forth along the receptacle bottom between said parallel walls for pumping the lower level contents including sludge from the receptacle, a trough disposed within the upper part of the receptacle and supported by said parallel walls and disposed to one side of and substantially parallel to said rail, said trough having an open end opening outwardly of the receptacle through one of said walls, and said pump having an outlet discharging into the trough and disposed for movement longitudinally of the trough in unison with said trolley.

References Cited in the file of this patent

UNITED STATES PATENTS

| | | |
|---|---|---|
| 1,609,830 | Pruss | Dec. 7, 1926 |
| 1,879,135 | Downes et al. | Sept. 27, 1932 |
| 1,986,573 | Hardinge | Jan. 1, 1935 |
| 2,168,264 | Marshall | Aug. 1, 1939 |